US008465295B2

(12) United States Patent
Taskovics et al.

(10) Patent No.: US 8,465,295 B2
(45) Date of Patent: Jun. 18, 2013

(54) FLUID PERCUSSION SYSTEM AND METHOD FOR MODELING PENETRATING BRAIN INJURY

(75) Inventors: Steven M. Taskovics, Framingham, MA (US); Brett H. Kobelin, Billerica, MA (US); Marc S. Pepi, Sudbury, MA (US); Steven R. Mitchell, Danville, NH (US)

(73) Assignee: The MITRE Corporation, McLean, VA (US)

( * ) Notice: Subject to any disclaimer, the term of this patent is extended or adjusted under 35 U.S.C. 154(b) by 958 days.

(21) Appl. No.: 12/027,142

(22) Filed: Feb. 6, 2008

(65) Prior Publication Data

US 2010/0120007 A1    May 13, 2010

(51) Int. Cl.
*G09B 23/28* (2006.01)
(52) U.S. Cl.
USPC .................. 434/270; 434/262; 73/37; 73/807; 73/825
(58) Field of Classification Search
USPC .................... 434/270; 73/760, 788, 807, 808, 73/811, 816, 825
See application file for complete search history.

(56) References Cited

U.S. PATENT DOCUMENTS

| | | | |
|---|---|---|---|
| 3,739,625 A * | 6/1973 | Roberts et al. ................ 73/12.07 |
| 3,830,562 A | 8/1974 | McGrann et al. |
| 3,997,270 A | 12/1976 | Suzuki |
| 4,111,044 A * | 9/1978 | McClure .......................... 73/215 |
| 4,205,551 A * | 6/1980 | Clifford et al. .................... 73/52 |
| 4,313,289 A | 2/1982 | Birdsong, Jr. |
| 4,495,703 A | 1/1985 | Sakata et al. |
| 4,554,838 A * | 11/1985 | Paus ................................. 73/761 |
| 5,841,541 A | 11/1998 | Dlugos |
| 5,953,681 A * | 9/1999 | Cantatore et al. ............... 702/31 |
| 6,141,106 A | 10/2000 | Blum |
| 6,408,694 B1 | 6/2002 | Lin et al. |
| 6,595,068 B2 * | 7/2003 | Brovold et al. ................. 73/803 |
| 7,243,536 B2 * | 7/2007 | Bolze et al. ................ 73/152.24 |
| 7,578,165 B1 * | 8/2009 | Stupecky ....................... 73/1.81 |
| 7,768,428 B1 | 8/2010 | Leisure |
| 2002/0066308 A1 * | 6/2002 | Shapiro ..................... 73/152.18 |
| 2006/0117866 A1 * | 6/2006 | Myers ............................. 73/837 |
| 2007/0134108 A1 * | 6/2007 | Her ................................. 417/417 |
| 2009/0032446 A1 * | 2/2009 | Wiemers et al. ................ 210/85 |

OTHER PUBLICATIONS

Dragonfly Inc. Model HPD-1700 Installation and Setup Manual, Dragonfly Research & Development, Inc., Ridgeley, WV, pp. 1-22, http://www.dragonflyinc.com/FP/HPD1700.htm.

* cited by examiner

*Primary Examiner* — Gene Kim
*Assistant Examiner* — Joseph B Baldori
(74) *Attorney, Agent, or Firm* — Sterne, Kessler, Goldstein & Fox P.L.L.C.

(57) ABSTRACT

A fluid percussion system for modeling penetrating brain injury includes a fluid percussion device that takes inputs in the form of pressurized gas and electrical signals from a computer and outputs a single hydraulic pulse, or multiple hydraulic pulses in quick succession. The fluid percussion device may include a pneumatic cylinder assembly and a hydraulic cylinder assembly that is actuated by the pneumatic cylinder assembly to produce the hydraulic pulse(s) of pressurized fluid. Each pulse may be used to rapidly inflate and deflate an attached balloon (representing a brain penetrating device). The balloon may be inserted in a test specimen, and the rapid inflation and deflation of the balloon creates a lesion that simulates a penetrating brain injury. A calibration system that employs an optical sensor may be used to determine maximum balloon diameter achieved during rapid inflation.

17 Claims, 10 Drawing Sheets

FLUID PERCUSSION SYSTEM AND METHOD FOR MODELING PENETRATING BRAIN INJURY

STATEMENT REGARDING FEDERALLY-SPONSORED RESEARCH AND DEVELOPMENT

Part of the work performed during development of this invention utilized U.S. Government funds. The U.S. Government has certain rights in this invention. The U.S. government has a paid-up license in this invention and the right in limited circumstances to require the patent owner to license others on reasonable terms as provided for by the terms of Contract Nos. W15P7T-05-C-F600 and W15P7T-07-C-F600 awarded by the U.S. Army.

BACKGROUND OF THE INVENTION

1. Field of the Invention

The present invention relates to systems for modeling penetrating brain injury (PBI) typically relating to ballistics. More particularly, the present invention relates to a fluid percussion system and method for simulating brain injuries in animal models.

2. Background Art

Penetrating brain injury (PBI) from projectiles is a leading cause of mortality and morbidity in modern warfare and accounts for a significant number of traumatic brain injuries worldwide. Therefore, the accurate simulation of ballistic PBIs in an animal model is important for clinical PBI pathology.

A conventional system for simulating ballistic brain injuries involves a closed hydraulic system actuated by a manually controlled pendulum to deliver a pulsed fluid for rapid inflation and deflation of a balloon (representing the penetrating device) that is inserted in an animal test subject. A hydraulic cylinder/piston assembly may include a striker plate at an exposed end of the piston that is hit by a falling pendulum, whereby high pressure fluid is delivered from the cylinder through a high pressure hose. The hose is hydraulically connected to the balloon inside the test subject (e.g., inside a brain of a rat) that becomes inflated during the duration for the pressure pulse. The balloon may be fixed in position and connected to the hose by means of a chronically implanted Luer lock fitting on the rat's skull.

By changing the angle through which the pendulum falls or by adding weight to the pendulum, the striking force of the pendulum on the striker plate of the hydraulic cylinder/piston assembly may be adjusted. A pressure transducer coupled to an oscilloscope may measure the system pressure. A magnet may be mounted on the pendulum and a magnetic switch may be mounted near the striker plate. When the magnet on the pendulum swings past the magnetic switch, a trigger switch for the oscilloscope may be activated, whereby the pressure data can be matched with pulse time and a timebase of the oscilloscope may be provided. For a flat faced striker plate, a time duration of the pulse may be about 10 ms, which may be lengthened by attaching a facing of shock absorbing foam to the striker plate. Model #HPD-1700 Fluid Percussion Device, produced by Dragonfly, R&D, Inc. of Ridgeley, W. Va., is an example of a conventional, pendulum-based fluid percussion device for simulating ballistic brain injuries. The Model #HPD-1700 Installation and Setup Manual, available at www.dragonflyinc.com/FP/HPD1700.htm, is incorporated herein in its entirety by reference thereto.

It is necessary to gauge the size of the inflated balloon (i.e., balloon diameter) to measure and quantify the extent of the resulting brain lesion, as well as allow calibration of the system (i.e., balloon size control). Typically, such a calibration of balloon size involves a ruler placed adjacent the balloon whose inflation is videotaped. The video-recorded balloon inflation may then be frozen at a video frame in which the balloon is perceived to be at its maximum diameter frame, thereby permitting visual measurement on the ruler of the balloon size. Such a method of calibration involves the operator to determine at which frame the balloon is at its maximum diameter and to compare the balloon size against the ruler.

This conventional system for PBI modeling has several limitations. The manual operation of pendulum provides inconsistent pulses and increases experimental variability in the PBI modeling studies. Such a system is also unable to perform rapid and consecutive pulses, and data capture may be difficult when the output reading is oscilloscope-based. Further, it is difficult to adjust the time duration of the pulse and striking force of the pendulum. In addition, the calibration method for gauging balloon size is not only difficult, but also involves increased likelihood of human error in the determination of balloon size. This error may lead to inaccurate determination of balloon inflation size and irreproducible experiments during PBI studies.

What is needed, therefore, is a fluid percussion system and method for modeling PBI in which pulse and duration are easily adjusted, consistent multiple pulses may be delivered to the animal test subject, and reproducible and quantifiable measures of outcome are generated. The present invention satisfies these and other needs, as will be made apparent by the description of the present invention that follows.

BRIEF SUMMARY OF THE INVENTION

A fluid percussion system and method suitable for penetrating brain injury (PBI) modeling is presented. In one embodiment, the system includes a pneumatic cylinder assembly and a hydraulic cylinder assembly actuated by the pneumatic cylinder assembly to produce a hydraulic pulse of pressurized fluid. This hydraulic pulse may be used for hydraulically inflating a balloon that simulates a penetrating device during PBI studies. The pneumatic cylinder assembly includes a piston rod that strikes an end of a piston rod of the hydraulic cylinder assembly when a pressurized gas is delivered to the pneumatic cylinder assembly. This striking of the piston rod of the hydraulic cylinder assembly produces the hydraulic pulse. The pneumatic cylinder assembly may also actuate the hydraulic cylinder assembly so as to produce multiple hydraulic pulses in rapid succession.

The system may include a solenoid valve that is selectively activated to deliver one or more pulses of pressurized air to the pneumatic cylinder assembly. When a pulse of pressurized air is delivered, the pneumatic cylinder assembly actuates the hydraulic cylinder assembly to produce a hydraulic pulse. An electronic controller may be used for controlling the delivery of pressurized air to the pneumatic cylinder assembly. In one embodiment, a relay in electronic communication with the controller activates the solenoid valve to deliver the pulse of pressurized air. Electronic control of the solenoid valve provides the ability to generate very controlled hydraulic pressure wave(s) by using the piston rod of pneumatic cylinder assembly to strike the piston rod of the hydraulic cylinder assembly. Each hydraulic pulse inflates the balloon in a consistent and fully adjustable fashion. This eliminates the physical manipulation of the pendulum necessary in the conventional system for PBI modeling and reduces the likelihood of experimental variability. A fluid percussion system in accordance with the present invention may be used to replicate diverse, salient features of clinical ballistic PBI pathology, generate reproducible and quantifiable measures of outcome, and may be scalable by injury severity and animal model under test.

Also presented is calibration system that may be used to determine a diameter of the balloon during dynamic inflation via the hydraulic pulse. In one embodiment, the calibration system includes a base configured to hold a hollow needle having an elongated balloon attached thereto that is inflated by hydraulic fluid exiting the needle, an optical sensor having an optical laser configured to extend transverse to a longitudinal axis of the needle, and a measurement device for measuring a distance between the optical laser and the needle. The optical sensor may include two arms vertically extending from an optical sensor support. The optical laser extends horizontally between the two vertical arms, and the needle extends between the vertical arms so that the balloon when inflated may break the optical laser. The optical sensor support may be linearly moveable along a vertical rail disposed on the base so as to position the optical laser a given distance from the needle. In one embodiment, the optical sensor support is selectively positioned on the rail between at least a first vertical position in which the balloon when inflated breaks the optical laser and at least a second vertical position in which the balloon when inflated does not break the optical laser.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. In the drawings, like reference numbers, letters, or renderings indicate identical or functionally similar elements.

DETAILED DESCRIPTION OF THE INVENTION

Figure 1:
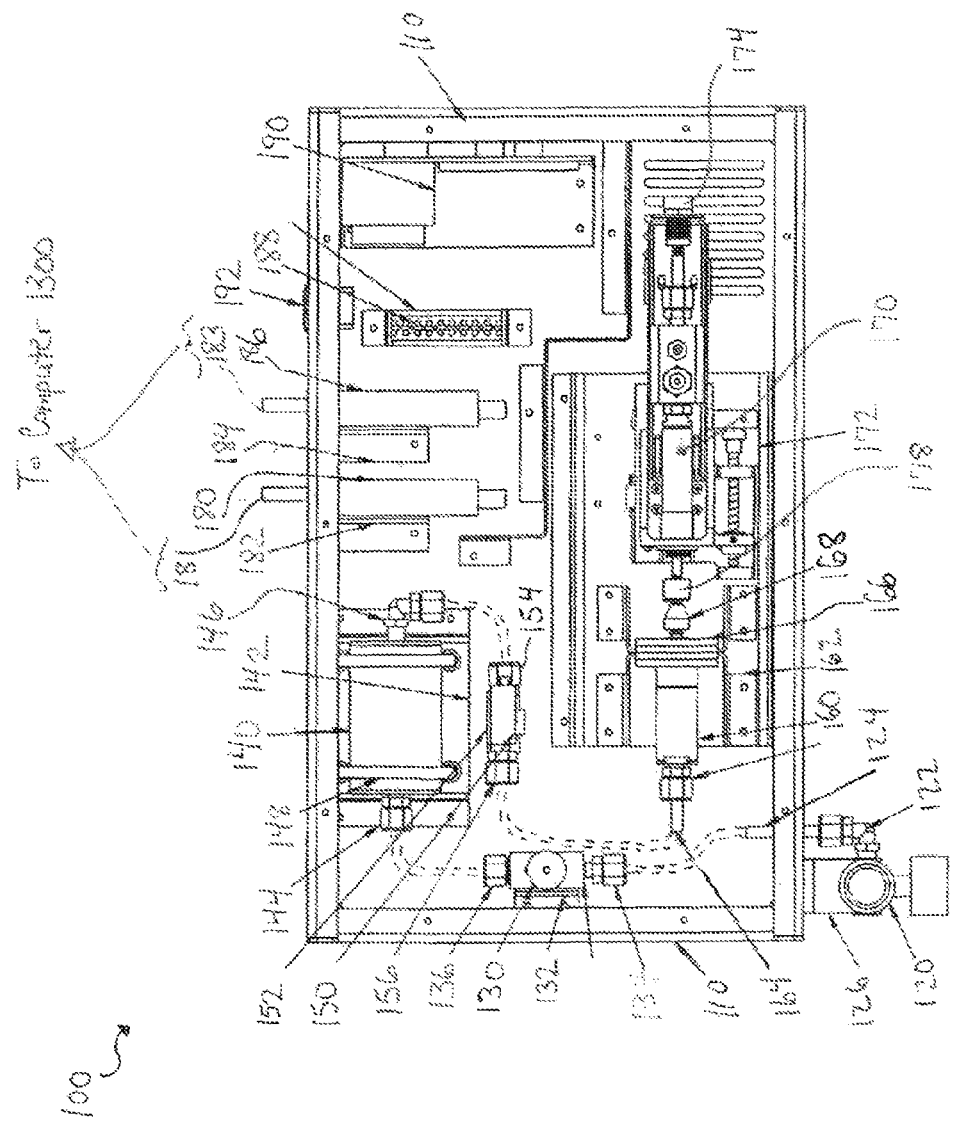
FIG. 1 is a top view of a fluid percussion device, in accordance with one embodiment of the present invention.
Figure 2:
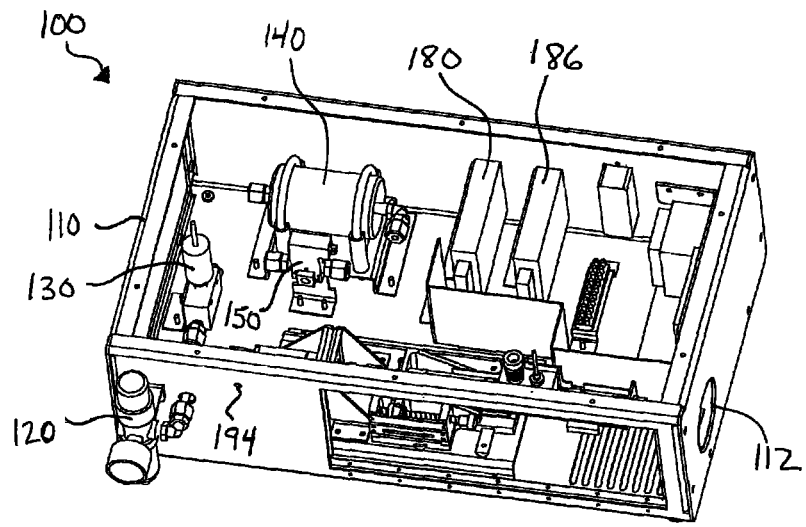
FIG. 2 is a front perspective view of the fluid percussion device of FIG. 1.
Figure 3:
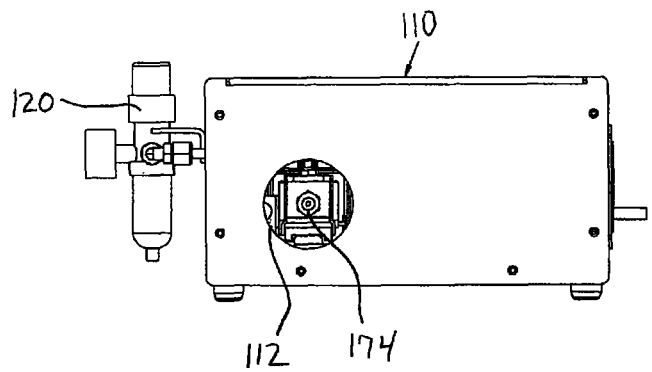
FIG. 3 is a side view of the fluid percussion device of FIG. 1.

FIGS. 1-4 illustrate a fluid percussion device (and/or components thereof) that, in general, takes inputs in the form of pressurized gas (e.g., air) and electrical signals from a computer and outputs a single hydraulic pulse or double (or more) hydraulic pulses, for quickly inflating and deflating an attached silicone-based balloon. Referring to FIGS. 1-3, an embodiment of a fluid percussion device 100 in accordance with an embodiment the present invention will be described. A majority of mechanical components of fluid percussion device 100 are housed in a system enclosure 110, which may include a hinged top cover and a front door (neither shown), to permit top and front access to the interior of system enclosure 11.

Within system enclosure 110 are housed pneumatic, hydraulic, and electric components of fluid percussion device 100. In particular, pneumatic components include a pressure transducer 130 for measuring an applied air pressure, and accumulator 140 for maintaining a constant applied air pressure, an electrical solenoid 150 for controlling the delivery of the pressurized air to a pneumatic cylinder assembly 160. Pneumatic cylinder assembly 160 includes an air cylinder/piston that actuates a hydraulic cylinder assembly 170. The hydraulic components include hydraulic cylinder assembly 170 having a hydraulic cylinder/piston (later described with reference to FIG. 4), a fast-acting pressure transducer 460 (see FIG. 4), and a connection 174 for connecting a pipetting needle assembly 500 (later described with reference to FIGS. 5 and 6). Electrical components include a power source 190; a terminal block 188; a data acquisition unit 186 that receives pressure measurements from air pressure transducer 130 and hydraulic pressure transducer 460 and provides these measurements to later described computer system 1300; and a relay 180 in electrical communication with a controller of later described computer system 1300, for allowing computer control of solenoid 150.

Accumulator 140 receives air from an air source outside system enclosure 110 via a regulator 120 mounted to a front side of enclosure 110. Regulator 120 may also include a filter for filtering the air received from an air source (not shown). A right side of enclosure 110 includes a port 112 through which pipetting needle assembly 500 may be attached to connection 174. On a rear side of enclosure 110 is provided a power connection 192 as well as respective USB ports 181 and 183 for connection of relay 180 and data acquisition unit 186 to computer 1300. On the rear side of enclosure 110 may be provided an internal breaker fuse and a power switch (neither shown). On the front side of enclosure 110 is an LED power indicator 194.

The pneumatic, hydraulic, and electrical components are mounted inside enclosure 110 by means of several brackets.

Specifically, pressure transducer 130 is mounted via bracket 132; air accumulator 140 is mounted via bracket 142 and U-bolt clamps 148; solenoid 150 is mounted via bracket 152; pneumatic cylinder assembly 160 is mounted via bracket 162 and brace bracket 166; and hydraulic cylinder assembly 170 is mounted via bracket 172. Relay 180 and data acquisition unit 186 are mounted via respective brackets 182 and 184. Regulator 120 is mounted to an exterior side of system enclosure 110 via bracket 126.

A pressurized gas (e.g., air) is delivered to pneumatic cylinder assembly 160 from regulator 120 through a series of hoses, or tubing, (shown in phantom) connecting the pneumatic components together. In the embodiment shown, air is provided from regulator 120 through an elbow fitting 122 (e.g., ¼" diameter fitting) connected to a tubing 124 (e.g., ¼" diameter plastic tubing) extending into system enclosure 110. The applied air pressure for dynamic pulses (and dynamic inflation of the balloon) may be controlled at regulator 120, and may be between 80-120 psig, and in one embodiment, the applied pressure may be between 60 and 80 psig, and in another embodiment, the applied air pressure should not exceed 90 psig. In one embodiment, for static inflation of the balloon, the applied pressure does not exceed 25 psig.

Tubing 124 sends air to an inlet 134 of pressure transducer 130. The air exits pressure transducer 130 at 136 and is sent to an inlet 144 of accumulator 140. Accumulator 140 stores a reserve of air for ensuring a consistent air pressure delivered to pneumatic cylinder assembly 160. Air exits accumulator 140 at 146 and is delivered to an inlet 154 of solenoid 150. When relay 180 activates solenoid 150 for rapid valve opening and closing, a pulse of high-pressured air is release through solenoid 150 at 156 to an inlet 164 of pneumatic cylinder assembly 160.

In operation, the pulse of high-pressured air released through solenoid 150 actuates the pneumatic piston of pneumatic cylinder assembly 160 so as to extend an end 168 of the pneumatic piston toward hydraulic cylinder assembly 170 and strike a rubber bumper 178 provided on an end of the hydraulic piston of hydraulic cylinder assembly 170. Striking force of point 168 against rubber bumper 178 actuates hydraulic cylinder assembly 170 so as to send a wave of high-pressured hydraulic fluid contained therein to later described pipetting needle assembly 500 (via connection 174). Fast-acting hydraulic pressure transducer 460 senses the hydraulic pressure wave provided to pipetting needle assembly 500 and provides pressure data (i.e., voltages readings) to data acquisition unit 186 for capture by computer system 1300.

Figure 4:
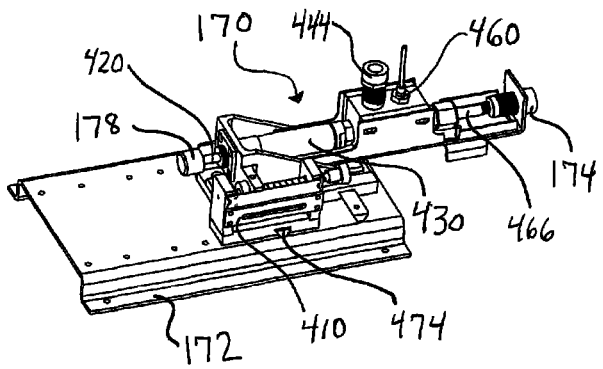
FIG. 4 is a perspective view of a hydraulic cylinder assembly in accordance with one embodiment of the present invention.

Further description of hydraulic cylinder assembly 170 will now be described with reference to FIG. 4. As noted above, rubber bumper 178 is connected to an exposed end of a piston 420 of assembly 170. Rubber bumper 178 may also be threaded to permit the end of piston 420 to be screwed to a base end of a cylinder 430, thereby holding piston 420 in a depressed position in cylinder 430, as may be desired during bleeding of the hydraulic system. Piston 420 reciprocates within a cylinder 430 filled with hydraulic fluid (e.g., distilled water). When rubber bumper 178 is struck by end 168 of the pneumatic piston, high-pressure hydraulic fluid is sent from assembly 170 through a hose 466 to connection 174. Connection 174 may be a female end of a quick connect assembly having a press release button (e.g., McMaster CARR Part 5478 K117) to facilitate attachment and detachment of a corresponding male end connection 510 of pipetting needle assembly 500 (see FIG. 5). Assembly 170 is mounted on bracket 172 and further braced by dovetail blocks 474 to ensure assembly 170 remains stationary and aligned to bracket 172 when actuated by pneumatic cylinder assembly 160. The position of hydraulic cylinder assembly 170 may be adjusted relative to pneumatic cylinder assembly 160 via a thumb screw (not shown) mounted on track 410. Hydraulic cylinder assembly 170 may further include a T valve 444 for bleeding the hydraulic fluid from assembly 170. An exemplary method for bleeding hydraulic cylinder assembly 170 is described below in Example 2. In the case where another hydraulic assembly 170 with a larger or smaller cylinder is required, hydraulic assembly 170 can be removed from bracket 172 after removal of captive hardware (not shown) and sliding assembly 170 forward on dovetail blocks 474.

Figure 5:
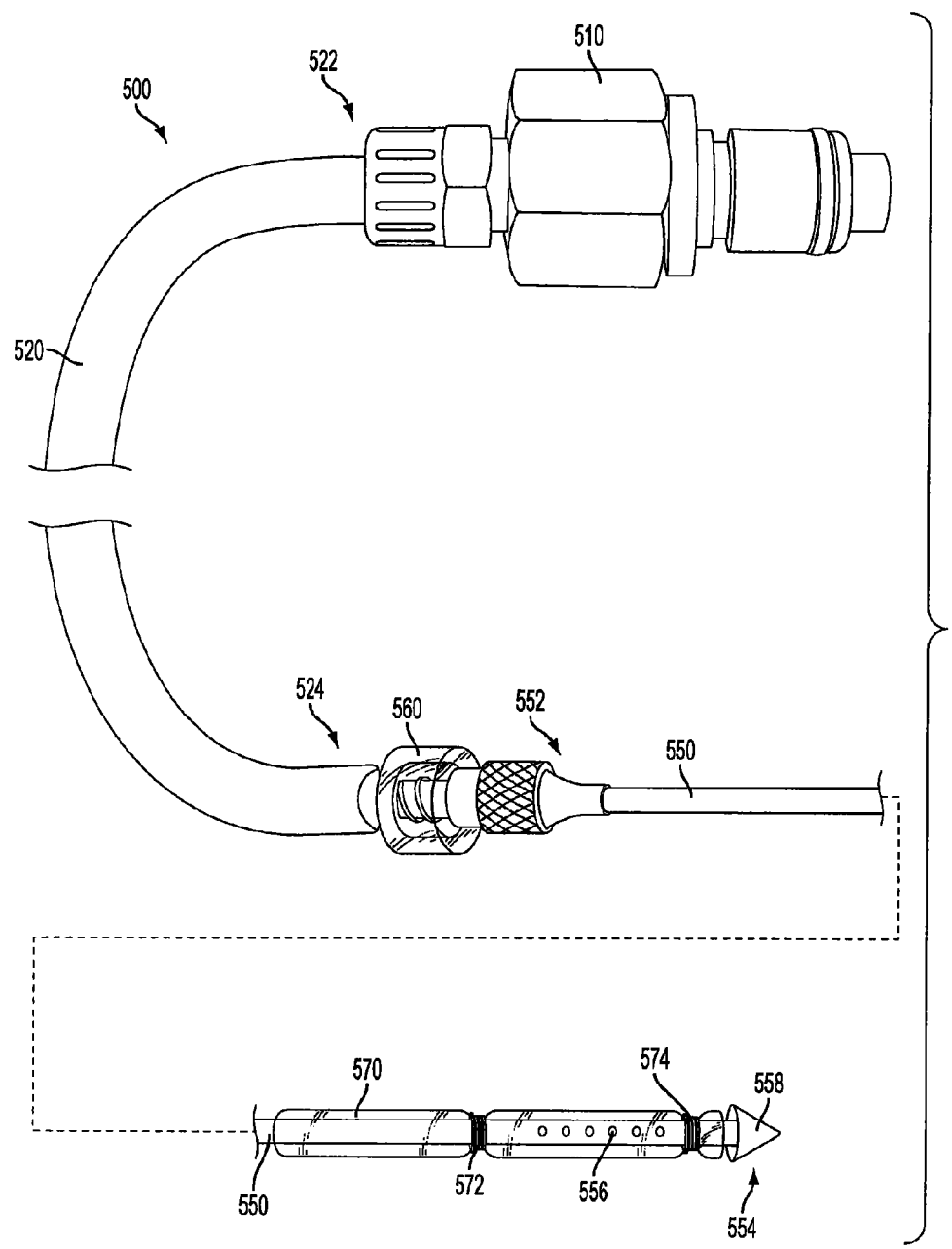
FIG. 5 is a schematic of a pipetting needle assembly in accordance with one embodiment of the present invention.

Pipetting needle assembly 500 will now be described with reference to FIG. 5. In the embodiment shown, pipetting needle assembly 500 includes male end connection 510, a flexible hose 520, a luer fitting 560 disposed on a proximal end 552 of a pipetting needle 550, and an elongated balloon 570 (e.g., made of silicon) extending over a distal portion of pipetting needle 550. A proximal end 522 of a flexible hose 520 is joined to male connection 510, and distal end 524 of hose 520 is connected to luer fitting 560 of pipetting needle 550. A distal end 554 of pipetting needle 550 is provided with a cone-shaped point 558 to facilitate the needle's penetration into the body of an animal test subject (e.g., the brain of the animal). In one embodiment, cone tip 558 is provided with a sharp point 558a (shown in FIG. 6A) to further facilitate penetration into the animal test subject. A distal portion of pipetting needle 550 includes a series of perforations, or holes, 556, and elongated balloon 570 extends over this distal portion so as to cover perforations 556. Wires 572 and 574 are wound over balloon 570 so as to secure balloon 570 to needle 550 and provide a liquid tight seal. Wires 572 and 574 are positioned at respective ends of the series of perforations 556, with perforations 556 sandwiched therebetween. As such, when hydraulic fluid is provided to pipetting assembly 500, fluid exits the needle at perforations 556 so as to rapidly inflate that portion of balloon 570 that extends between wires 572 and 574. When the hydraulic pressure wave is concluded balloon 570 rapidly deflates. The rapid inflation and deflation of balloon 570 simulates a penetrating device (e.g., a bullet or other ballistic projectile). Pipetting needle 550 with balloon 570 may be inserted in the brain of an animal test subject, whereby the rapid inflation and deflation of the balloon in the test subject creates a lesion that simulates a penetrating brain injury.

Figure 6:
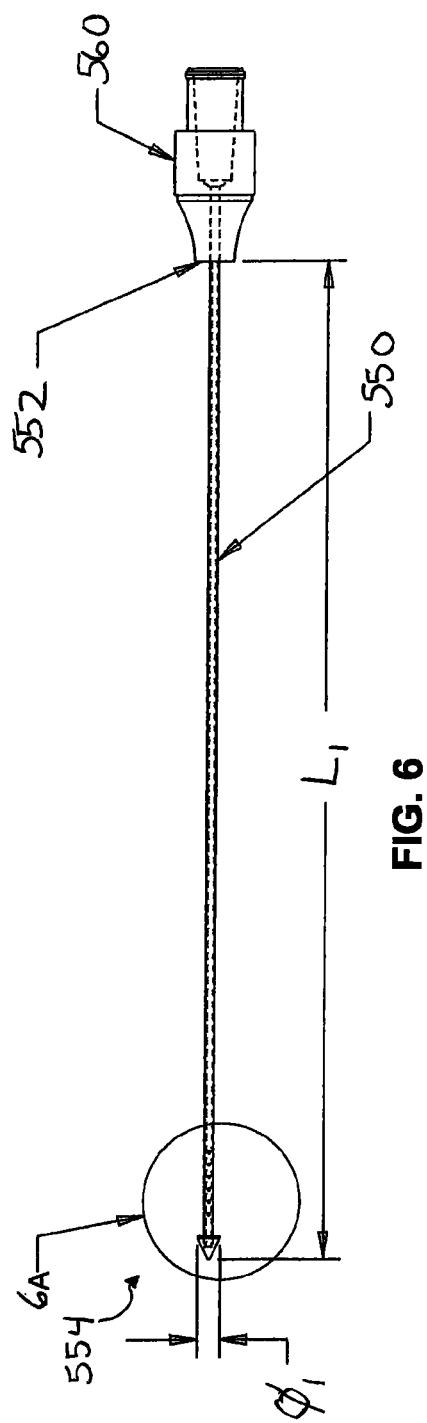
FIG. 6 is a side view of a pipetting needle in accordance with one embodiment of the present invention.
Figure 6A:
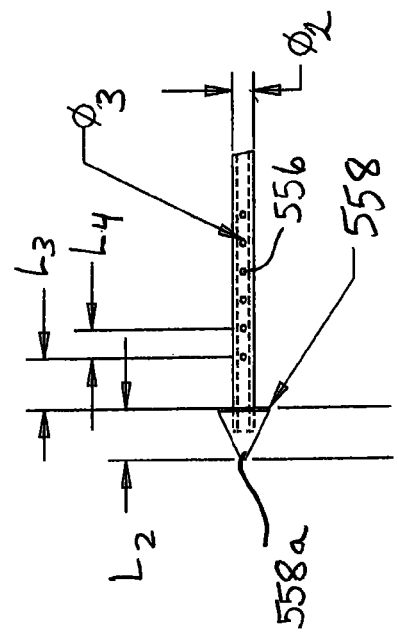
FIG. 6A is a detailed view of a distal end portion of FIG. 6.

Further description of pipetting needle 550 will now be described with reference to FIGS. 6 and 6A. In the embodiment of FIG. 6 and corresponding detailed view of FIG. 6A, pipetting needle 550 may include an elongated portion having a diameter $\varnothing_2$ and a length $L_1$. In one embodiment, length $L_1$ is about 4.05", and diameter $\varnothing_2$ is about 0.036". Cone-shaped tip 558 may have a slightly larger diameter $\varnothing_1$ of about 0.09". A length $L_2$ of cone-shaped tip 558 may be about 0.09". Adjacent to tip 558 are the series of perforations of 556, which in one embodiment, are spaced linearly adjacent to one another by a distance $L_4$ of about 0.05". In one embodiment, a length $L_3$ of about 0.09" separates tip 558 from the first of perforations 556.

Figure 7:
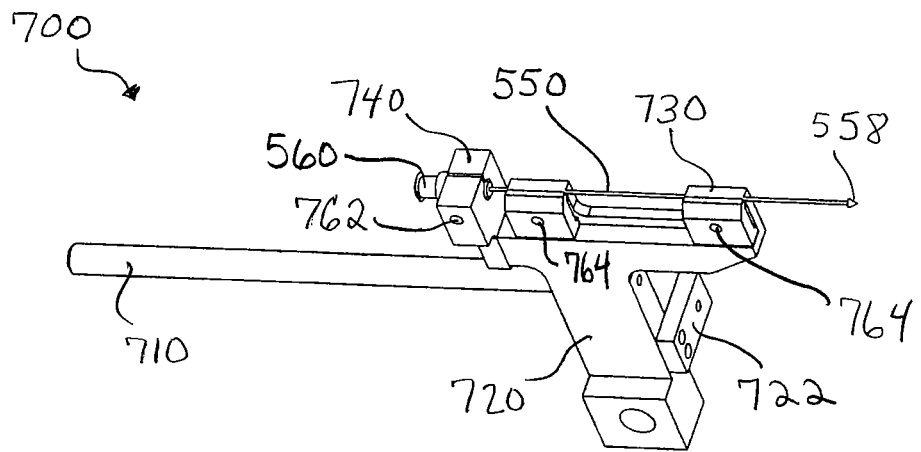
FIG. 7 is a perspective view of a manipulator arm, in accordance with one embodiment of the present invention.

Description of a manipulator arm assembly 700 for holding pipetting needle 550 during balloon diameter calibration will now be described with reference to FIG. 7. In the embodiment of the FIG. 7, manipulator arm 700 includes an elongated rod holder 710 extending longitudinally from a base holder 720. Disposed on a top portion of base holder 720 is a needle holder 730 for holding pipetting needle 550. Pipetting needle 550 is clamped to needle holder 730 by tightening of thumb screws 764. Manipulator arm 700 further includes a luer holding block 740 that clamps luer fitting 560 of pipetting needle 550 by means of a thumb screw 762. A stop block 722 is fixed to a front surface of base holder 720 to facilitate alignment of manipulator arm 700 onto a calibration unit 800, described below with reference to FIGS. 8-11.

In one embodiment, calibration unit 800 may be used for determining the inflated diameter of balloon 570. Determination of balloon diameter when inflated is desired so as to correlate balloon diameter with a size of a penetrating device that the inflation simulates. For example, a larger sized penetrating device is simulated by a larger balloon diameter. Further, it is desirable to know the hydraulic pressure that corresponds to the resulting inflated balloon diameter and the bullet size the balloon may represent. Accordingly, a calibration of inflated balloon diameter is needed to determine the set points of hydraulic operating pressure during PBI studies, as well as to quantify and compare results amongst test runs. Calibration unit 800 provides determination of balloon diameter in a dynamic mode (i.e., balloon diameter is determined by rapidly inflating balloon 570, as it would be inflated during testing on an animal subject), which facilitates accurate and reproducible balloon inflation. In particular, while the balloon may be statically inflated while calibrating, static inflation may not be representative of the same inflation of the balloon by a dynamic hydraulic pulse, and static inflation may result in leaking or breaking of the balloon. Accordingly, for PBI studies, calibration is preferably based on dynamic inflation of the balloon.

Such dynamic mode measurement of balloon diameter is obtained using an optical sensor, or switch, 840 that provides an optical laser transverse to a longitudinal axis of pipetting needle 550. By raising and lowering optical sensor 840 and determining a position of the optical laser relative to pipetting needle 550, a radius of balloon diameter when rapidly inflated may be determined. Calibration unit 800 may be used for dynamic inflation of balloon 570 during a single hydraulic pulse, or wave, but may also be used for calibration of balloon diameter as it is determined from a first pulse of a double pulse test. Further, it may be possible to extrapolate the balloon diameter during a second pulse from a correlation of balloon diameter vs. hydraulic pressure data from the first pulse.

Specifically, calibration unit 800 is operated so as to determine at what position the inflated balloon interrupts the optical laser. For example, manipulator arm 700 is secured to calibration unit 800 so that balloon 570 of pipetting needle 550 extends between arms 840a and 840b of optical sensor 840. In this embodiment, needle 550 may be secured to manipulator arm 700 prior to positioning manipulator arm 700 on calibration unit 800. Pipetting needle 550 is joined to hose 520 of pipetting needle assembly 500, as described above with reference to FIG. 5. Connections 510 of pipetting needle assembly 500 may then be joined to connection 175 of fluid percussion device 100.

Figure 11:
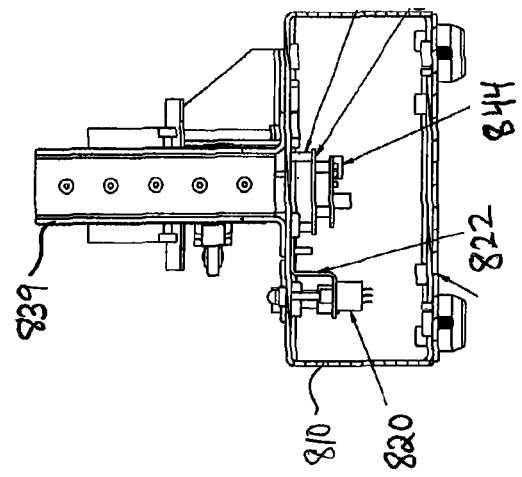
FIG. 11 is a front view of the calibration unit of FIG. 8.

Manipulator arm 700 is held and positioned on calibration unit 800 on a base 810 of calibration unit 800, by means of a toggle clamp 862, a manipulator arm holder 860, and a manipulator arm stop 864. Base 810 of calibration unit 800 is provided with feet 812, which may be adjustable so as to ensure base 810 is level on a surface. As shown in FIG. 11, below a top surface of base 810 is provided a potentiometer 820 (held to the top surface of base 810 by a bracket 822) and an optical switch control circuit 844, for operation of optical sensor 840. Optical sensor 840 is supported by an optical sensor platform 842 that is linearly moveable along a vertical rail 831 and associated guide block 830. The desired vertical position of optical sensor platform 842 is adjusted by tightening of a thumb screw 836 on rail 831 at an appropriate location, thereby fixing a position of optical sensor 840. A bearing holder 838 extends vertically from optical sensor platform 842 and holds a gage pointer 834 that points to a measurement device 832 (e.g., a ruler) disposed vertically on a linear rail holder 839.

Figure 8:
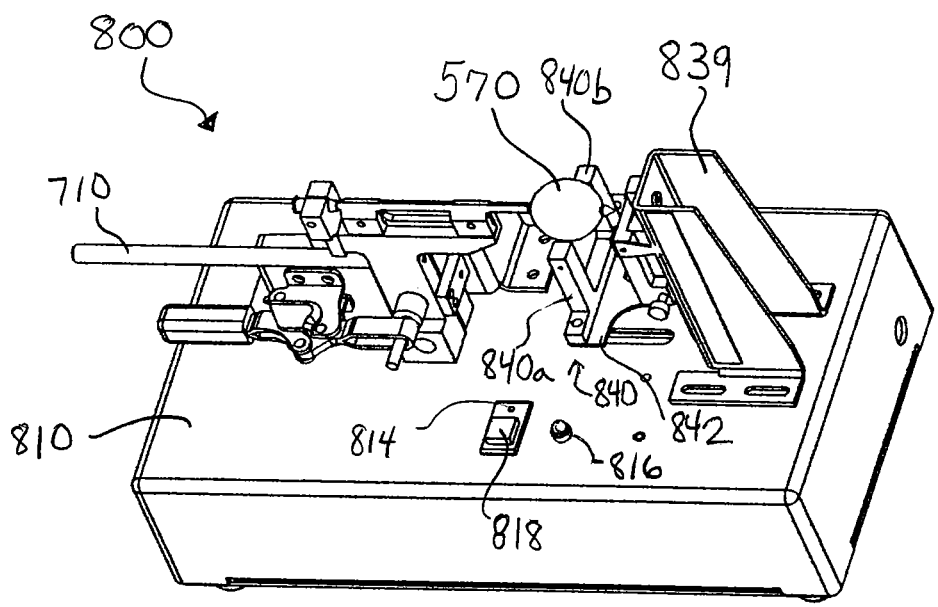
FIG. 8 is a perspective view of a calibration unit for determining balloon inflated balloon diameter in accordance with one embodiment of the present invention.
Figure 9:
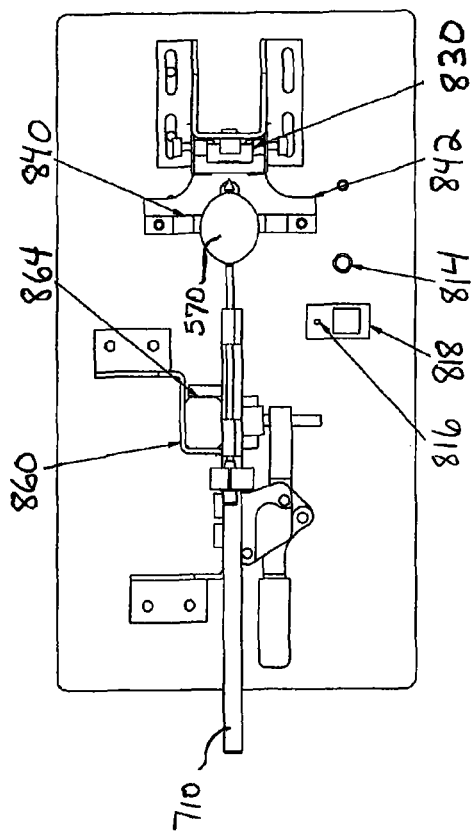
FIG. 9 is a top view of the calibration unit of FIG. 8.
Figure 10:
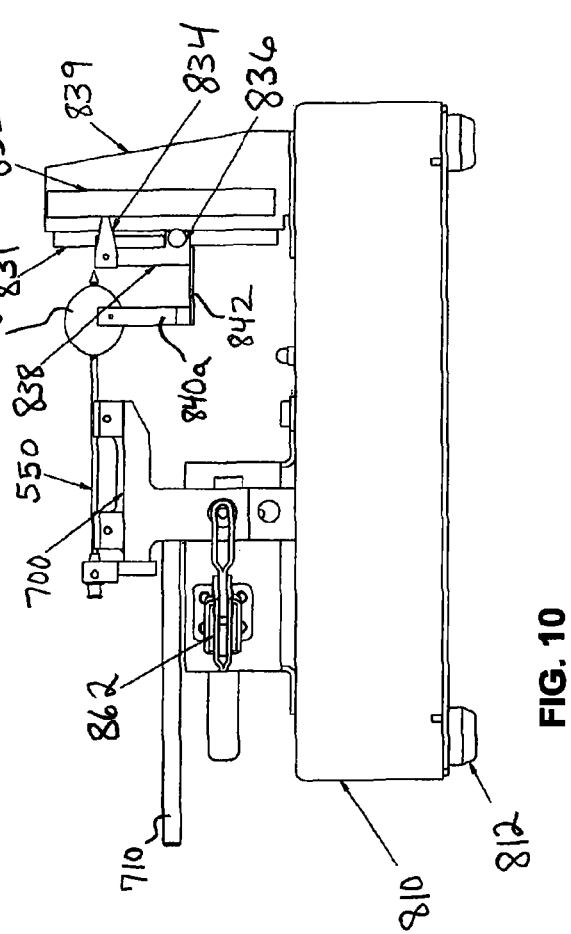
FIG. 10 is a side view of the calibration unit of FIG. 8.

In operation, with calibration unit 800 powered on via power switch 818, which is indicated by light up of an LED 816, a hydraulic pressure wave is delivered by fluid percussion device 100 so as to dynamically inflate balloon 570 (FIGS. 8-10 show balloon 570 inflated). It is observed whether a second LED 814 is lit when balloon 570 is inflated, indicating that the optical beam of optical sensor 840 has been broken. If LED 814 lights up, then optical sensor 840 is lowered along vertical rail 831 and fixed in its new vertical position by tightening of screw 836. LED 814 is a helpful indicator when the optical beam is an infrared frequency and is therefore not visible. It should be apparent that another indicator mechanism, such as an alarm sound, for example, may be used in place of LED 814.

Fluid percussion device 100 is then operated to send another pressure wave to pipetting needle 550 to inflate balloon 570. If LED 814 again lights, then optical sensor 840 should be lowered in additional small increments (e.g., 0.02") with a pressure wave delivered at each increment, until optical sensor 840 is at a vertical position in which LED 814 no longer lights. Once LED 814 no longer lights, optical sensor 840 may be raised higher at about half of the previously utilized increments and the balloon 570 inflated again to refine the calibration, if desired. Similarly, if LED 814 does not light with initial balloon inflation, then raised optical sensor 840 may be incrementally raised until the LED 814 lights. Once a user is satisfied with the determination of balloon diameter as provided by a position in which LED 814 lights and a position in which LED 814 does not light, then the user may record a measurement on ruler 832 designated by gage pointer 834. An initial setting for optical sensor 840 for starting calibration testing may be the static balloon inflation diameter. In one embodiment, a 0 point is defined by the balloon radius at its static inflation, and optical sensor 870 is positioned at the 0 point as measured by gage pointer 834 on ruler 832. Optical sensor is then raised or lowered on vertical rail 831 at increments such as 0.2" to determine the position at which LED 814 lights and/or does not light.

Since the radii of balloon 570 may be a different for different circumferential points of balloon 570 (such as when balloon 570 inflates off-center from pipetting needle 550), further calibration measurements may be taken by rotating needle 550 so as to rotate the position of balloon 570 relative to optical sensor 840. Calibration may then be repeated for balloon inflation at different circumferential points of balloon 570. An average of all balloon measurements obtained at various circumferential points will likely capture the true balloon dimension despite off-center balloon inflation.

It is preferred that balloon calibration is employed on a pre-loaded balloon (i.e., a balloon having been inflated at least once for preliminary stretching of the balloon material). The balloon may be preloaded during installation of the balloon on pipetting needle assembly 500, prior to any experimentation with fluid percussion device 100, by connecting distal end 552 of pipetting needle 550 to a small syringe (not shown) that is filled with water (e.g., about 3 mL). With balloon 570 covering perforations 556 (and secured to needle 550 by wires 572, 574), the syringe plunger is slowly depressed. If balloon 570 is made of silicone, the balloon may change to an opaque white once stressed. The balloon deflates upon release of the plunger. The plunger may be repeatedly depressed and released until it is observed that a more rapid, lower pressure inflation and no color change occurs. Pipetting needle 550 may then be detached from the syringe and connected to leer fitting 560 of pipetting needle assembly 500.

Figure 12:
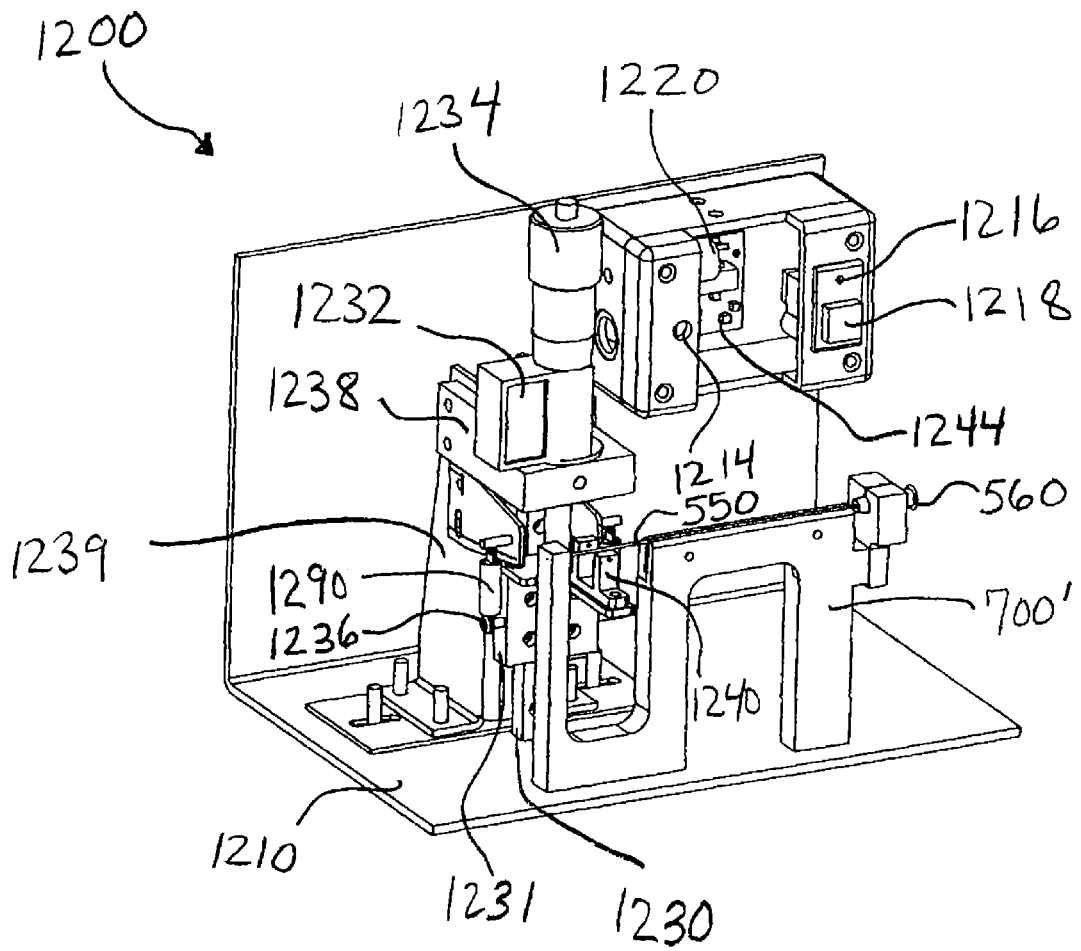
FIG. 12 is a perspective view of a calibration unit, in accordance with another embodiment of the present invention.

A second embodiment of a calibration unit will now be described with reference to FIG. 12. As shown in FIG. 12, a calibration unit 1200 includes a manipulator arm 700', which is fixed permanently to a base plate 1210 of calibration unit 1200. Pipetting needle 550 is harnessed to manipulate arm 700' so that the needle's distal end portion extends between the arms of optical sensor 1240. In this embodiment, a micrometer head 1234 with a measurement display 1232 is employed, instead of the gage pointer 834 and ruler 832 of calibration unit 800. Micrometer head 1234 is mounted on a holder 1238 secured to a sensor measurement and support structure 1239. Also secured to support structure 1239 is rail 1231 and associated guide block 1230. Optical sensor 1240 moves with rail 1231 along guide block 1230 so as to be moved between various vertical positions relative to pipetting needle 550. Optical sensor 1240 is fixed in a given vertical position by tightening of thumb screw(s) 1236. In this embodiment, springs 1290 extend one end from a stationary point on support structure 1239 and a second end disposed on rail 1231 so as to be extended or compressed depending on movement of rail 1231. A potentiometer 1220 and optical sensor switch control circuit 1244 are mounted on a vertical sidewall of calibration unit 1200. Power switch 1218 and associated "power-on" indicator via LED 1216 (e.g. a red light) are also mounted on the vertical wall of calibration unit 1200. An LED 1214 (e.g. a yellow light) for determining whether the optical beam has been broken by balloon 570 (not shown) is provided adjacent to potentiometer 1220. An exemplary method of calibrating a balloon using calibration unit 1200 is described below with reference to Example 1. It will be apparent to persons skilled in the relevant art that the method of example 1 may be appropriately modified to achieve balloon calibration using calibration unit 800.

Figure 13:
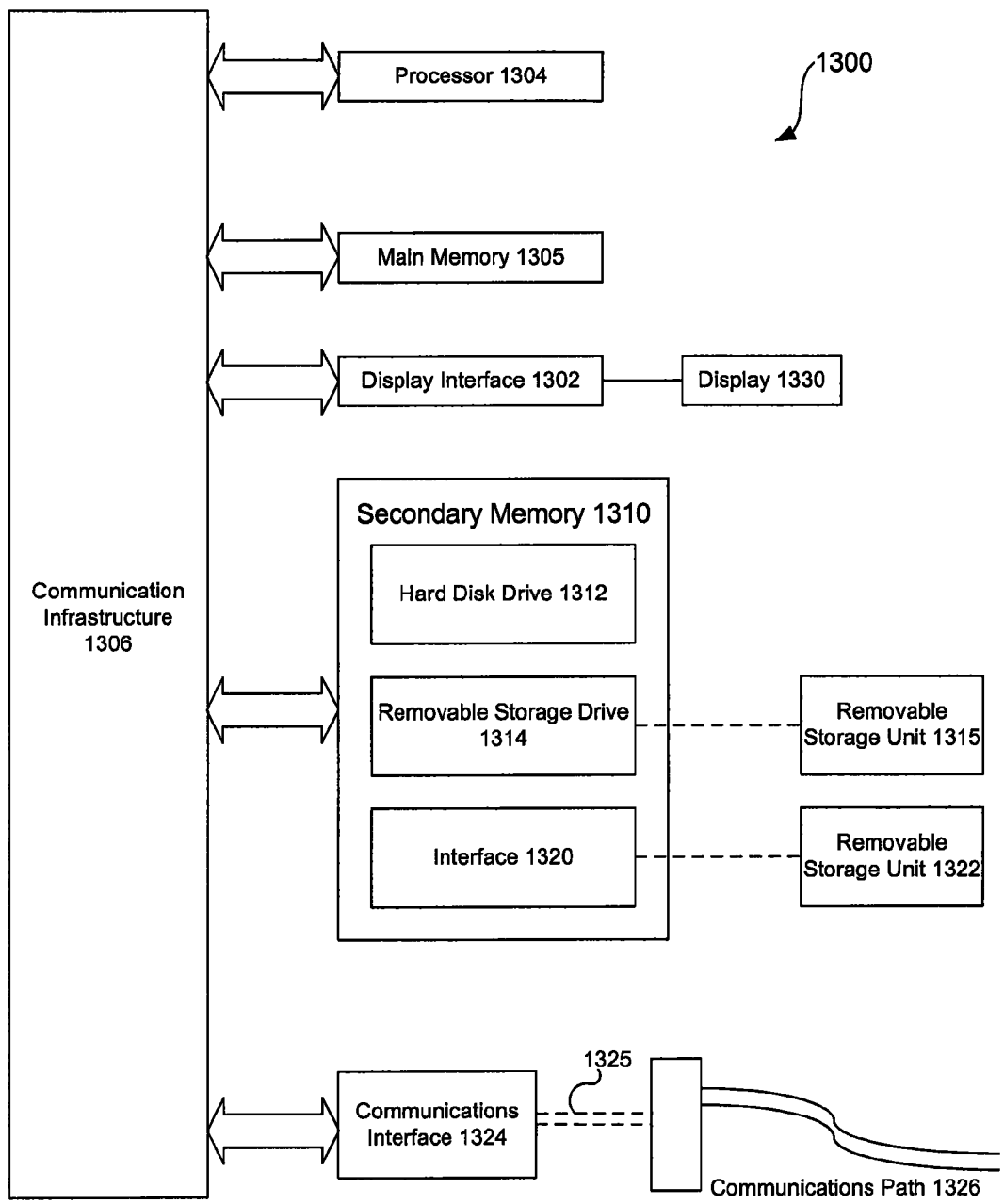
FIG. 13 is an exemplary computer system in which a software application for computerized control of a fluid percussion device may be implemented as computer-readable code, in accordance with an embodiment of the present invention.

One or more software applications may be used to carry out computerized control of fluid percussion device 100 (e.g., computerized triggering of solenoid 150 via relay 180, and retrieval of pressure data from data acquisition unit 186). FIG. 13 illustrates an exemplary computer system 1300, in which control of fluid percussion device 100 and data retrieval therefrom can be implemented as computer-readable code. Various embodiments of the invention are described in terms of this example computer system 1300. After reading this description, it will become apparent to a person skilled in the relevant art how to implement the invention using other computer systems and/or computer architectures.

FIG. 13 illustrates one or more processors, such as processor 1304. Processor 1304 can be a special purpose or a general purpose digital signal processor. The processor 1304 is connected to a communications infrastructure 1306 (for example, a bus or network). Various software implementations are described in terms of this exemplary computer system. After reading this description, it will become apparent to a person skilled in the relevant art how to implement the invention using other computer systems and/or computer architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1305, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1315 in a well known manner. Removable storage unit 1315, represents a floppy disk, magnetic tape, optical disk, etc. which is read by and written to by removable storage drive 1314. As will be appreciated, the removable storage unit 1315 includes a computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a PCM-CIA slot and card, wired or wireless systems, etc. Software and data transferred via communications interface 1324 are in the form of signals 1325 which may be electronic, electromagnetic, optical or other signals capable of being received by communications interface 1324. These signals 1325 are provided to communications interface 1324 via a communications path 1326. Communications path 1326 carries signals 1325 and may be implemented using wire or cable, fiber optics, a phone line, a cellular phone link, an RF link and other communications channels.

In this document, the terms "computer program medium" and "computer usable medium" are used to generally refer to media such as removable storage drive 1314, a hard disk installed in hard disk drive 1312, and signals 1325. These computer program products are means for providing software to computer system 1300.

Computer programs (also called computer control logic) are stored in main memory 1305 and/or secondary memory 1310. Computer programs may also be received via communications interface 1324. Such computer programs, when executed, enable the computer system 1300 to implement computerized control of fluid percussion device 100 as discussed herein. In particular, the computer programs, when executed, enable the processor 1304 to implement the processes of the present invention, such as the method(s) implemented as described above. These processes may be performed automatically, or invoice some form of manual intervention. Accordingly, such computer programs represent controllers of the computer system 1300. Where computerized control of fluid percussion device 100 is implemented using software, the software may be stored in a computer program product and loaded into computer system 1300 using removable storage drive 1314, hard drive 1312 or communications interface 1324.

The invention is also directed to computer products (also called computer program products) comprising software stored on any computer useable medium. Such software, when executed in one or more data processing device, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

For example, a software application for specifically tailored for computer control of fluid percussion device 100 may be implemented in conjunction with a commercially-available software product that installs drivers for connection of relay 180 and data acquisition unit 186 to computer system 1300, as well as installation of a measurement and automation program. An example of such a commercial software product is NI-DAQmx by National Instruments of Austin, Tex., which provides a programming interface for programming analog and/or digital input/outputs & counters on data acquisition hardware devices. For example, the software application for control of fluid percussion device 100 (including, e.g., electronic signaling to relay 180 to trigger solenoid 150 to open; and signaling data acquisition unit 186 to record pressure data from pressure transducers at a given sample frequency) may be prepared as a program code that is executable through NI-DAQmx software, as should be apparent to one of ordinary skill in the relevant art(s).

Figure 14:
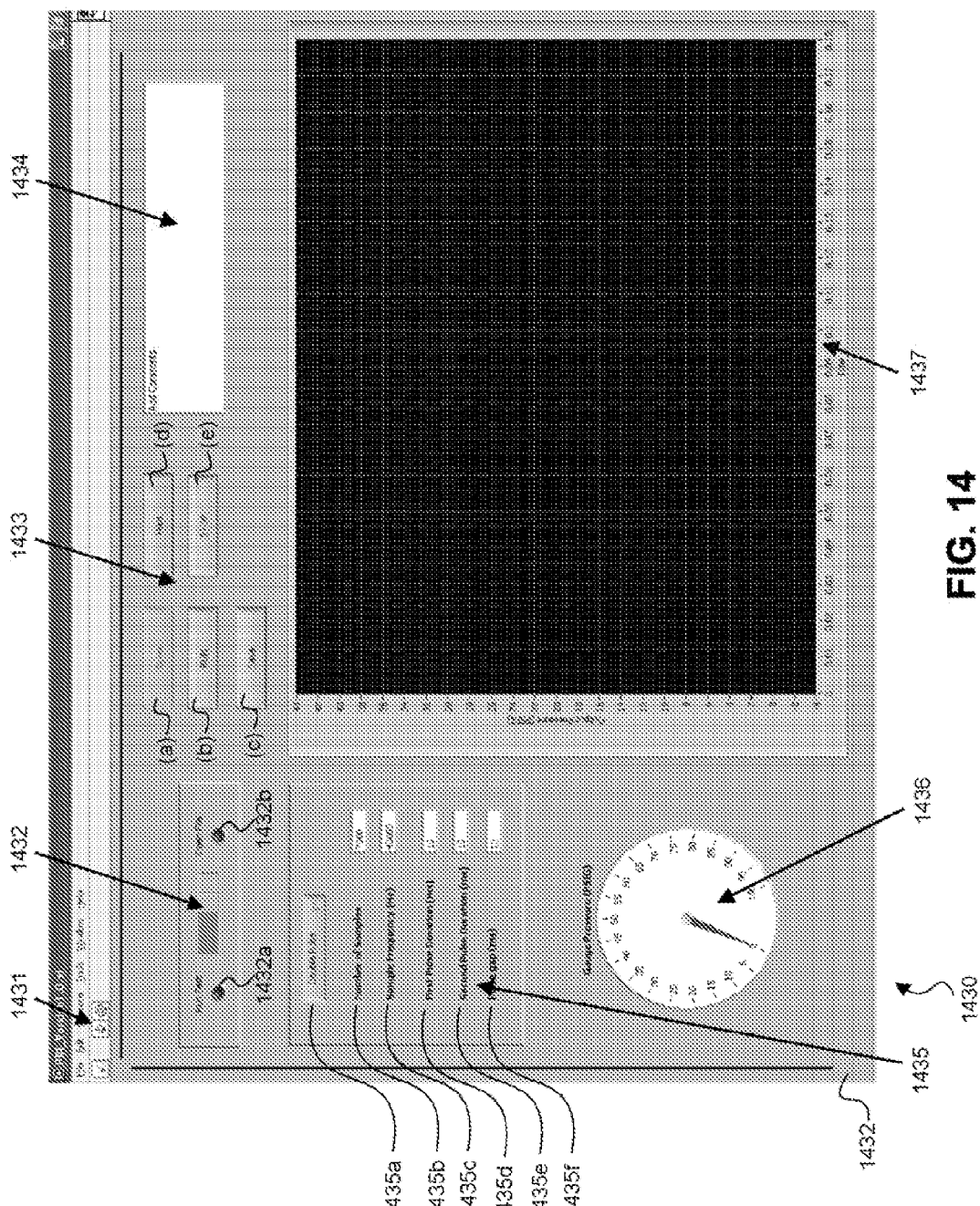
FIG. 14 is a schematic of a graphical user interface of a computer system for receiving user inputs and displaying process data.

FIG. 14 illustrates an embodiment of a display unit 1430 of computer system 1300, having an exemplary graphical user interface 1432 for providing processed data to a user and for receiving control parameters from the user for operation of fluid percussion device 100. The software application for computer control of fluid percussion device 100 may be configured to include appropriate execution of the exemplary features described herein with reference to graphical user interface 1402, as would be apparent to one skilled in the relevant art(s). In particular, a user may select between simulation and gathering of new data or opening a previously saved data by using a mode selector 1432. In one embodiment, a user is prevented from opening a saved test file while in a Test mode 1432a, and is prevented from running a test while in an Open File mode 1432b, and is required to select either one of Run Test mode 1432a or Open File mode 1432b at the start of the program. A start button 1431 is pressed to start the program once the desired mode is selected. Various control buttons 1432 are used to carry out the functionality of fluid percussion device 100 including (a) opening a file, (b) running a test, (c) saving data, (d) printing data, and (e) stopping a program. In one embodiment, if in Run Test mode 1432a, the pressing of the start button 1431 will cause an influx of data from the pressure transducers 130 and 460, described above, but the test will not run until control button (b) for running a test is engaged. If Open File mode 1432b is selected when the program is started, control button (b) for running a test will be disabled.

A comments box 1434 may be provided where the user may add comments regarding a current test run. These comments may be saved and printed with the associated test file. Graphical user interface 1432 may also a hydraulic pressure sensor output graph 1437 and a pneumatic pressure gauge 1436.

In the embodiment of FIG. 14, settings 1435 are provided to allow the user to input test variables for the particular test run. Settings 1435 may include a selection 1435a for setting whether the test is a single pressure pulse test or a double pressure pulse test. If a single pulse test is selected, computer system 1300 will operate solenoid 150 (via relay 180) to deliver a single inflation of balloon 570. If a double pulse test is selected, computer system 1300 will operate solenoid 150 to generate two inflations in sequence of balloon 570. In one embodiment, if the user selects a single pulse test (via setting 1435a), then the second pulse duration setting and pulse gap setting may be disabled.

The software application may further include the ability to select (via setting 1435b) the number of measurement points to be recorded by pressure transducer 460 in the hydraulic line. In one embodiment, the default setting is 7,000 samples. The user may also select the sample frequency (Hz) (at setting 1435c), which is the rate at which the measurement samples will be collected. In one embodiment the default setting is 25,000 Hz. A user may also select the pulse duration (ms) for a first pulse and/or a second pulse (via respective settings 1435d and 1435e). The setting of pulse duration determines the length of time that air pressure will be applied to pneumatic cylinder assembly 160. Specifically, the first pulse duration is the time in milliseconds that the solenoid 150 is active, or open so as to inflate balloon 570, before closing and ending the first pulse. The second pulse duration is likewise the time in milliseconds that the solenoid is again active or open before closing. While there is no upper limit for setting pulse duration, maintaining static inflation of balloon 570 may increase the risk of leak and damage to the balloon. In one embodiment, a default value is 40 ms for either the first or second pulse duration. Computer relay timing may be inherently limited such that a true pulse duration may vary by +/−5 ms. In one embodiment, the time duration of the first pulse and the second pulse (if provided) is 15 ms. Further, the user may be able to select a pulse gap (time in milliseconds, via setting 1435f) between multiple pulses, which is the gap in time between the two consecutive pulses, e.g., between the first and second pulse, in a two pulse test. In one embodiment, a default value for the pulse gap is 40 ms. There may be some time lag inherent in computer relay timing, therefore, an about 8 ms time delay may occur even with a pulse gap set at 0 ms. In one embodiment (not shown on interface 1432), a setting for a second pulse gap for selecting the gap between a second and third pulse, in a three pulse test, is also provided.

The number of samples and the sample frequency may determine the time scale for hydraulic pressure sensor output graph 1437. Pressure graph 1437 provides the pressure applied to the balloon over time (e.g., psig v. time). If a test is longer than the displayed timescale, the number of samples and/or sample frequency may be adjusted to capture enough data. For example, to lengthen the timescale, the number of samples may be increase, the sample frequency may be decreased, or combination of adjustment to these settings may be employed. In one embodiment, the number of samples divided by the sample frequency should be at least twice the test time. Further, in one embodiment, a ratio of number of samples to sample frequency has a minimum threshold of 0.1, and an error message will appear on interface 1432 if the user enters settings 1435b (number of samples) and 1435c (sample frequency) below this threshold.

Figure 15:
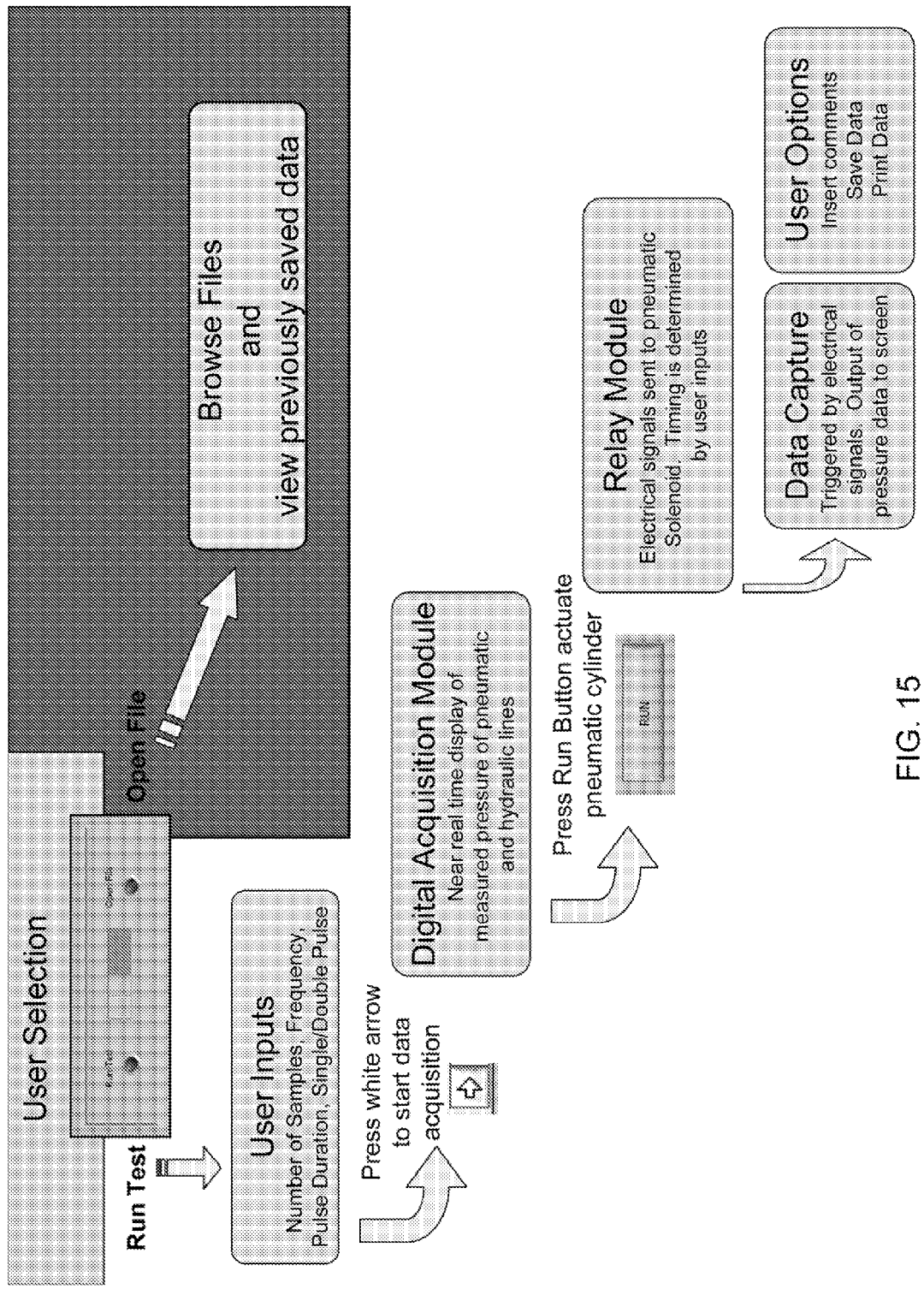
FIG. 15 is a flowchart of an exemplary process of operation of the software application for computerized control of a fluid percussion device, in accordance with an embodiment of the present invention.

When a test is run, pressure transducer 460 in the hydraulic line records measurements according to the user defined settings and displays the data in pressure graph 1437. Air pressure read by pressure transducer 130 is displayed by gauge 1436. Pressure transducer 130 thereby provides an accurate reading of incoming air pressure from regulator 120 and may also be saved and printed with the associated test file. Upon completion of a test, the test run may be saved using the control button (c) for saving data, and the saved filed may contain the pressure graph data, input air pressure data, and the user's comments. In Open File mode 1432b of mode selector 1432, a user may open a file and click start button 1431 in order to view and print previously saved files. In this manner, either currently run files or previously saved files may be printed to a desired printer connected to computer system 1300. An embodiment of the operation described above is graphically represented by the flowchart of FIG. 15.

In one embodiment, the software application for operation and control of fluid percussion device 100 includes the ability for the user to inflate balloon 570 via a selection on a computer interface provided for that purpose.

EXAMPLES

Example 1

Balloon Calibration Method

As noted above, calibration unit 1200 may be used for determining the correlation of maximum balloon diameter for a given hydraulic pressure pulse. The following steps outline an exemplary procedure for calibrating a silicon balloon (e.g., balloon 570) using a single pulse delivered from fluid percussion device 100. This calibration method may also be applied to the first pulse of a double pulse test, and, having calibrated the first pulse of a double pulse test, it may be possible to extrapolate the balloon dimension for the second pulse from the hydraulic pressure data.

Step 1. Ensure that the setup is complete and fluid percussion device 100 has successfully been tested, but before experimentation has begun with specimens. Specifically, calibration is preferably employed after fluid percussion device 100 has been setup (i.e., installation and pre-loading of the silicon balloon on pipetting needle 550, air, power, and computer have been successfully connected to fluid percussion device 100, and the above-described software application has been installed on the computer) successful connections to, and installation of the software).

Step 2. As shown in FIG. 12, insert needle 550 into manipulator arm 700' so the balloon is positioned between arms of optical sensor 1240 and clamp the needle in place by tightening thumb screws on manipulator arm 700' just enough to hold it. Using interface 1432 on computer system 1300, run a single pulse test on fluid percussion device 100, observing the balloon inflations to determine where the balloon's diameter is greatest. Using the thumb screw(s) 1236 on rail 1231, laterally position the optical sensor at a determined point of greatest inflation. An initial set point may be based on the balloon diameter during static inflation.

Step 3. LED 1214 lights when the optical beam has been broken and will remain lit for three seconds.

Step 4. Turn the micrometer head clockwise, lowering the optical sensor past the needle until LED 1214 turns off. Slowly raise the optical sensor (turning counter clockwise) until LED 1214 turns on. The optical sensor is now at the zero point, observe and record the reading of the micrometer display. Lower the optical sensor the distance of the user defined balloon radius plus 20 thousandths of an inch. To arrive at the micrometer measurement that should be displayed, add 0.020" to the user defined balloon radius and subtract this number from the recorded zero point. Note that the zero point for the optical sensor will vary between calibration systems and for different balloons.

Step 5. Generate a single pulse on fluid percussion device 100 with the default software settings described above and observe LED 1214. Wait five seconds and execute a second single pulse test. If the results at LED 1214 (lighting or not lighting) were the same continue to Step 6. If the results varied, wait five seconds and execute additional tests until two successive tests yield the same results.

Step 6. If two successive tests caused the LED 1214 to light, lower the micrometer head in small increments, running a test to inflate the balloon on each increment, until the LED no longer lights. Once the LED no longer lights the user may raise the micrometer by half of the previously utilized increments and test again to refine the calibration. The refinement of the calibration is at the user's discretion. If two successive tests failed to light LED 1214, raise the micrometer head in small increments, running a test to inflate the balloon on each increment, until the LED lights. Once the LED lights, the user may lower the micrometer by half of the previously utilized increments and test again to refine the calibration.

Step 7. Record the micrometer head measurement. Rotate the needle 90 degrees and repeat Steps 4 through 6 to find the measurement at which the LED 1214 no longer lights. Record the new micrometer head measurement and repeat this step two more times. Four measurements in all may be taken describing the radius of the balloon for perpendicular sides. These radii may be averaged to accurately describe the balloon, especially in the instance that the silicon balloon happens to inflate off center and one measurement may then fail to capture the true balloon dimensions.

Example 2

Method for Bleeding Hydraulic Cylinder Assembly of Fluid Percussion Device

The following procedure explains an exemplary method for initially filling the hydraulic cylinder assembly 170 of fluid percussion device 100 and removing any air. This method may also be used if there is already water in the system and the intent is to bleed off any air that may have been introduced (e.g., during balloon changes). It is recommended that hydraulic cylinder assembly 170 be filled with distilled water.

Step 1. Connect pipetting needle assembly 500 hydraulic cylinder assembly 170 at connection 174. Unscrew the needle from hose 520 (at luer fitting 560) and place distal end 524 of hose 520 in a source of distilled water.

Step 2. Ensure hydraulic piston 420 is completely depressed or pushed into the cylinder (depressed piston 420 is not shown in the figures). Completely depress the plunger of a large plastic syringe (not shown) and then press fit an end of a flexible, syringe tubing (not shown) onto the large syringe. An opposite end of the syringe tubing is provided with a quick connect similar to connection 510 of pipetting needle assembly 500. Insert the syringe tubing quick connect into a female end quick connection on T valve 444. Press until the quick connect clicks, and locks into place.

Step 4. Keep the large syringe in a vertical orientation and elevated higher than the water source. Slowly actuate the syringe plunger and pull approximately 30 mL of distilled water into the syringe. If it is necessary to empty the syringe, remove the syringe, tubing, and quick connect at the T valve by pressing the release button located on the T valve. Once the quick connection is broken, a seal is made preventing water from escaping. Attach a quick connect release valve to the syringe tubing connection, depress the syringe to empty the water, remove the quick connect release valve, and reattach the syringe tubing connection to the T valve. Take hose 520 out of the distilled water and reattach luer fitting 560 to needle 550 (e.g., screw on using 1 to 2 turns). Slide balloon 570 so perforations 556 are exposed. Depress the large syringe, filling the needle with water until a steady stream is seen exiting the needle.

Step 6. Submerge needle 550 in the water source. With the large syringe vertically oriented and elevated higher than the water source, extend and depress hydraulic piston 420 repeatedly. If any air bubbles are seen in the syringe tubing, or hose 520, bleed them off using the syringe. It may help to actuate and depress the piston while bleeding the air.

Step 7. Once all the air is out of hydraulic cylinder assembly 170 and hose 520, make sure hydraulic piston 420 is completely extended. Remove the needle from the water source and slide the balloon over the outlet holes of the needle. Disconnect the large syringe, flexible syringe tubing, and quick connect at the T valve by pressing the release button on the female end quick connection of T valve 444. The hydraulic side of fluid percussion device 100 may now be ready for hydraulic pulse testing.

While distilled water is recommended because of its limited dissolved gases that may create air bubbles in the hydraulic lines, even distilled water may have some dissolved gases that over time will expand. If fluid percussion device 100 is left for a prolonged period of time with the hydraulic side filled it is possible that the user will return to find balloon 570 inflated with no pressure applied and the device turned off. The simplest way to relieve this increased hydraulic pressure it to connect the large syringe, flexible tubing and quick connect at the T valve as described in Step 3. By making this connection the excess pressure should push the syringe plunger out slightly and the balloon should deflate. Finally, disconnect the syringe, flexible tubing, and quick connect by pressing the release button on the T valve.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A fluid percussion system for modeling penetrating brain injury, comprising;
   a pneumatic cylinder assembly comprising a pneumatic piston and a piston rod at an end of the pneumatic cylinder assembly;
   a hydraulic cylinder assembly comprising a hydraulic piston and a piston rod at an end of the hydraulic cylinder assembly, wherein the end of the pneumatic cylinder assembly is detached from the end of the hydraulic cylinder assembly, wherein the hydraulic cylinder assembly is actuated by the pneumatic cylinder assembly to produce a hydraulic pulse of pressurized fluid, for hydraulically inflating a balloon that simulates a penetrating device; and
   a pipetting needle assembly,
   wherein the piston rod of the pneumatic cylinder assembly is opposite of the piston rod of the hydraulic cylinder assembly;
   wherein the end of the pneumatic cylinder assembly is configured to strike the end of the hydraulic cylinder assembly for the actuating of the hydraulic piston when pressurized gas is delivered to the pneumatic cylinder assembly, the striking of the piston rod of the pneumatic cylinder assembly with the piston rod of the hydraulic cylinder assembly producing the hydraulic pulse, and
   wherein the pipetting needle assembly is provided the hydraulic pulse of the pressurized fluid.

2. The system of claim 1, further comprising:
   an air accumulator for storing a reserve of pressurized air supplied to the pneumatic cylinder assembly;
   a solenoid valve fluidly interposed between the accumulator and the pneumatic cylinder assembly, that is selectively activated to deliver a pulse of pressurized air to the pneumatic cylinder assembly, wherein, when the pulse of pressurized air is delivered, the pneumatic cylinder assembly actuates the hydraulic cylinder assembly to produce the hydraulic pulse; and
   a hydraulic pressure sensor that senses the pressure of the hydraulic pulse.

3. The system of claim 2, further comprising an electronic controller for controlling the delivery of pressurized air to the pneumatic cylinder assembly to actuate the hydraulic cylinder assembly.

4. The system of claim 3, wherein the delivery of pressurized air to the pneumatic cylinder assembly is controlled so that the pneumatic cylinder assembly actuates the hydraulic cylinder assembly to produce a single hydraulic pulse or multiple hydraulic pulses in rapid succession.

5. The system of claim 4, further comprising,
   a relay in electronic communication with the controller for activation of the solenoid valve to deliver the pulse of pressurized air to the pneumatic cylinder assembly; and
   a data acquisition unit for collecting data from the hydraulic pressure sensor.

6. The system of claim 5, wherein the controller includes:
   a processor for processing data collected by the data acquisition unit; and
   a display interface for providing processed data to a user, and for receiving control parameters from the user.

7. The system of claim 5, further comprising a pneumatic pressure sensor that senses the air pressure applied to the pneumatic cylinder assembly, wherein the data acquisition unit is configured to receive data from the pneumatic pressure sensor.

8. The system of claim 1, further comprising:
   an elongated hollow needle including an end portion having perforations for hydraulic fluid to exit from the needle;
   a hydraulic hose fluidly connecting the hydraulic cylinder assembly to the needle, whereby the needle receives the hydraulic pulse of pressurized fluid; and
   an elongated balloon extending over the needle so as to cover the perforations, the balloon being secured to the needle so as to be inflated by the hydraulic fluid exiting the perforations of the needle.

9. The system of claim 8, wherein the hydraulic fluid is distilled water.

10. The system of claim 1, further comprising:
    an air accumulator for storing a reserve of pressurized air supplied to the pneumatic cylinder assembly, the accumulator being configured to maintain a constant applied air pressure delivered to the pneumatic cylinder assembly.

11. The system of claim 10, wherein the accumulator receives pressurized air from an air source via a regulator, the system further comprising:
    an air pressure transducer fluidly interposed between the accumulator and the regulator which delivers pressurized air to the air pressure transducer, wherein the air pressure transducer measures the applied air pressure delivered to the accumulator.

12. The system of claim 11, further comprising:
a solenoid valve fluidly interposed between the accumulator and the pneumatic cylinder assembly, that is selectively activated to deliver a pulse of pressurized air to the pneumatic cylinder assembly.

13. The system of claim 11, further comprising:
a hydraulic pressure transducer configured to sense the hydraulic pulse produced from actuation of the hydraulic cylinder assembly.

14. The system of claim 13, further comprising:
a processor, and
a data acquisition unit that is configured to receive pressure measurements from the air pressure transducer and the hydraulic pressure transducer and provide these measurements to the processor.

15. The system of claim 10, further comprising:
a solenoid valve fluidly interposed between the accumulator and the pneumatic cylinder assembly, that is selectively activated to deliver a pulse of pressurized air to the pneumatic cylinder assembly; and
a hydraulic pressure transducer configured to sense the hydraulic pulse produced from actuation of the hydraulic cylinder assembly.

16. A fluid percussion system for modeling penetrating brain injury, comprising:
pneumatic means for actuating a hydraulic cylinder assembly, comprising a hydraulic piston and a piston rod at an end of the hydraulic cylinder assembly, wherein the hydraulic piston is actuated to produce at least one hydraulic pulse of pressurized fluid through a hydraulic line;
wherein the pneumatic means includes a piston rod that is configured to strike the piston rod of the hydraulic cylinder assembly when pressurized gas is delivered to the pneumatic means;
valve means for delivering at least one pulse of pressurized gas to the pneumatic means to actuate the hydraulic cylinder assembly, wherein each pulse of pressurized gas delivered to the pneumatic means corresponds to a hydraulic pulse produced by the hydraulic cylinder assembly; and
a pipetting needle assembly,
wherein a pipetting needle assembly is provided the hydraulic pulse of the pressurized fluid.

17. The system of claim 16, further comprising:
controller means for operating the valve means so as to selectively deliver the at least one pulse of pressurized gas for a designated pulse duration, wherein the controller means includes a user interface means for receiving the designated pulse duration selected by a user;
sensing means for sensing the gas pressure delivered to the pneumatic means and for sensing the hydraulic pressure of the hydraulic pulse; and
data acquisition means for receiving pressure data from the sensing means and providing the pressure data to the controller means, wherein the controller means processes the pressure data and provides the processed data to the user interface means for display of the processed data to the user.

* * * * *